United States Patent [19]

Graf

[11] 4,264,910

[45] Apr. 28, 1981

[54] ELECTROSTATICALLY CONTROLLED AND SEGMENTED LIQUID RIBBON

[76] Inventor: Ronald E. Graf, Rte. 3, Box 520, Crozet, Va. 22932

[21] Appl. No.: 32,098

[22] Filed: Apr. 20, 1979

[51] Int. Cl.³ .............................. G01D 15/18

[52] U.S. Cl. .............................. 346/75

[58] Field of Search .............................. 346/75, 140 R

[56] References Cited

U.S. PATENT DOCUMENTS

| | | | |
|---|---|---|---|
| 2,676,868 | 4/1954 | Jacob | 346/75 |
| 2,925,312 | 2/1960 | Hollmann | 346/75 X |
| 3,893,623 | 7/1975 | Toupin | 346/75 X |
| 4,138,686 | 2/1979 | Graf | 346/75 |

OTHER PUBLICATIONS

Fan et al., Drop Shutter For Ink Jet Printing, IBM Tech. Disc. Bulletin, vol. 16, No. 3, Aug. 1973, p. 989.

*Primary Examiner*—Joseph W. Hartary

[57] ABSTRACT

Two methods of producing a ribbon-shaped stream of ink and of producing an orifice for the narrow ribbon stream under 0.0005 inches thick are disclosed. Also a rotating drum-like configuration with electrostatic sites on its surface is disclosed. The drum, due to irregularities on its surface, breaks the ribbon into segments corresponding to the sites. If desired, the segments will upon release from the drum form side by side broad streams of directionally controlled droplets. The axial spacing between the apparent origins of the droplet streams can be made less than the minimum center to center spacing between control sites, because the sites can, but need not, be located along helical paths so that successive sites on a helical path would participate in originating different streams. Site and segment spacing may be only a few thousandths of an inch. Drum construction, parallel wiring for duplicate wedges around the drum, slit cleaning, and drum cleaning are also disclosed.

10 Claims, 4 Drawing Figures

ELECTROSTATICALLY CONTROLLED AND SEGMENTED LIQUID RIBBON

BACKGROUND OF THE INVENTION

There are presently a large number of patents relating to ink drop printers which break each stream of ink, the streams being of substantially circular cross-section, into one controlled stream of droplets of ink. The present invention is probably the first design for an ink drop printer which breaks one stream of ink, in the form of a ribbon, into many side by side rougly parallel but controlled streams of droplets.

The idea of using electrostatic control sites on a rotating drum surface to control multiple streams of ink, each forming controlled droplet streams at or before the drum, is shown in U.S. Pat. No. 4,138,686 and in an application concurrent with this application. However the sites were aligned along parallel rings around the drum, making the spacing between droplet streams equal to the center to center spacing between sites and to the spacing between stream orifices. However, in the current invention the sites can be located more closely together than typical orifices of former art, and can be located, if desired, on helical paths. Therefore, the axial spacing between sites, and thus the spacing between droplet stream origins, can be far less than the center to center spacing between sites, if the sites are on helical paths. The apparent origin of each stream is somewhat blurred, because droplets may be released over a small range of rotation angles.

Advantages of the present invention over former art include the following. The one mil circular cross-section orifices necessary in former art are difficult to produce. Also they must be spaced further apart than the drum sites of the current invention. The ribbon of ink is easier to produce, since optically flat surfaces and accurate spacers, long available, can be employed as a single unit to replace the multiple orifices of former art.

The helically located sites allowing closely spaced controlled droplet streams give better definition to output than formerly possible with stationary stream origins and droplet paths controlled only in one direction (parallel to the output motion). Parallel control can be achieved in the current invention by timing the release of the droplets. It can be used to correct for output means positioning, and to correct for unequal travel times from the droplet stream origins to the output, due to unequal drag effects.

Site wiring has been improved ans simplified, since the same logic may now be used to control correspondingly positioned sites on the curved surface of each of a number of wedges. The wedges in combination form the whole drum. Only one wedge or two parts of wedges adding to one wedge or less are controlling ink segments at any one time. Thus the control instructions although repeated, due to parallel wiring, on all wedges actually only apply to the currently active contacting wedge portions.

Ionically conducting ink can be used in any of the preferred embodiments of this invention, since charging of droplets is not essential. Thus simply produced inexpensive ink can be electrostatically controlled as to flight path and can impact on a densely spaced matrix at the output.

SUMMARY OF THE INVENTION

This invention relates to electrostatically controlled ink drop printers, to formation of liquid streams, and to fluid switching of various forms under electrostatic control. In the first embodiment a stream of ink in the form of a liquid ribbon is projected toward a rotating drum, where by the word "drum" is meant a structure with many surface elements substantially at the same radius, these surface elements being substantially the most remote from an axis of substantial symmetry. In other words, the outermost elements of surface from an axis of rough symmetry are on roughly a circular cylinder. After contacting the drum surface the ink breaks up into segments. The breakup can be due, at least in part, to the cutting action of protruding lines on the surface of the drum, the ink preferably not adhering to the protruding ridges. The breakup can also be due, at least in part to the sudden application of electrostatic forces producing adhesion forces at electrostatic drum sites, known as control sites, other portions of the surface not having a similar force applied. Portions of the ink ribbon not adhering to the drum surface, due to electrostatic forces, will begin to bounce off the drum and to leave due to centrifugal force. These portions of ink will be captured in a gutter and returned to the ink supply.

It would be advantageous to chose the ink and contacting drum surfaces so that the ink will not wet or adhere significantly to the drum surface when no electrostatic force is applied. To aid the cutting action of the protruding ridges on the drum surface, which ridges may be similar to tiny knife edges, the velocity of the ribbon of ink relative to the drum surface at the time and point of contact between the ribbon and the drum surface should have a radial component toward the drum axis. The velocity components of the drum surface and the ink ribbon may be roughly equal in the tangential direction at the point of contact. The choice of velocities will depend in part on whether the sites are tilted toward their direction of travel or not. If sites not tilted in the forward direction are used, the relative velocity radially should be large enough to cause rapid cutting but small enough to allow capture of those portions of the ink ribbon falling subsequently on electrostatic drum sites, which are activated. The action of the drum is similar to that of a rolling cookie cutter. Because the ribbon lays down locally like a blanket on the drum surface, it may be useful to allow air to pass through the drum surface at each electrostatic drum site and possibly elsewhere, unless grooves are used to allow air trapped at a site to escape sideways. While passing through the region of first contact between the ribbon and the drum, it might be advisable to keep each site at a slightly negative pressure.

The ink held on an electrostatic drum site, equivalent to a droplet, will be released after a desired rotation arc around the drum, possibly a zero arc, has been traveled. The protruding knife edges will aid the release process by dragging an air current around the drum, so that each site is somewhat sheltered from air currents in motion relative to the site. Therefore, upon release of the electrostatic forces, the ink segment can pull into a rounder droplet shape before leaving the drum and encountering stronger air currents. The exact release position, which can be somewhat variable for each droplet (portion of ink held on a site), will determine where the droplet impacts on the output means. Thus corrections for travel time and movement of the output can be made. A secondary gutter may be used if droplets initially held at electrostatic drum sites are not desired on the output means. Paths to the secondary gutter may leave the drum surface before or after paths leading to the output means.

The electrostatic drum sites in one embodiment will be located on a number of helical paths, which wind around the drum axis at a constant radius. The axial displacement (parallel to the drum axis) components of each successive site on a helical path can be a small fraction of the minimum center to center distance between nearest sites. Thus axial displacement between droplet paths is not initially limited by site spacing. Furthermore, sites can be made so small that spacing between side by side sites (center to center) can be smaller than the spacing necessary between impact points to produce well defined good print characters using a matrix of impact points. A plurality of sites each on different helices can have the same axial coordinate. Droplets from such a plurality of sites may be thought of as part of the same one droplet stream leaving the drum. Thus the spacing between streams leaving the drum may be significantly less than the center to center spacing between side by side sites. This may be important in producing very precise images with shading on an output.

The ink ribbon may be produced by liquid exiting under high pressure from a slit having roughly the cross-section of the ink ribbon. The slit may be formed using spacers between two optically flat surfaces. Spacers of less than 0.0005 inches thickness may be formed of epoxy cement held between parallel optical flats on an optical bench, assuming that the cement does not adhere to the flats after hardening. The cement may of course be reinforced or another material may be used. These spacers, which can be produced in batches, are then placed between optically flat surfaces, which may or may not be the same surfaces used to produce the spacers. The surfaces can then be clamped or cemented to the spacers to form a slit of appropriate width and uniformity. Other methods of producing spacers may be employed. The slit can be cleaned during or after use in various ways including unclamping and opening the slit. It would be possible to run a pin or knife edge from one end of the slit to the other on the ink entrance side of the slit, thus dislodging all ink impurities which may have lodged across the slit. A short slit may require spacers only at the ends of the slit, but long slits across a page of print may require multiple spacers. The spacers not at the ends should be shaped to allow streamline flow through the slit and preferably they should be placed away from the opening of the slit.

Due to surface tension, the edges of a ribbon of ink will tend to be pulled in toward the center of the ribbon, but if the ribbon is traveling at about 700 inches per second, then the effect can only act for about one thousandth of a second or less before reaching the drum. In this time the edge will contract less than half a centimeter. Net surface tension forces acting on an element of area are zero, because of symmetry, except at the edges of the ribbon.

Another method of producing a ribbon of ink is to impact a very smooth solid surface with a stream of non-adhering ink and allow the stream to diverge from the center of impact. The thickness of the stream, assuming a small slowdown in ink speed and a flat solid surface, will be almost inversely proportional to the distance from the center of impact. Oddly shaped surfaces may be used to improve thickness uniformity along a straight border.

The drum may be long axially, stretching across a page and capable of forming a whole line of characters simultaneously. Alternately the drum may be not much longer than a character and mounted on a device similar to a typewriter to produce one line of print at a time, while traveling in either direction. If the output means stands still for each line of characters, then the rotational axis may be chosen perpendicular to the line of print.

For rough precision purposes, such as printing characters using matrices of possible dots on the output, the control sites may be arranged in rectangular or other type arrays on the drum, not necessarily along helical paths. The sites may or may not be contiguous. Site shape and elevation with respect to the average drum surface may vary.

Some sites may be wired in parallel to conserve wiring and logic. The same pattern of site area voltages will appear simultaneously on more than one arc around the drum, each such arc being the curved surface of a wedge which would be cut from the drum by two planes each containing the rotation axis.

A drum may be manufactured as a set of discs, each disc corresponding to one or a few columns of characters. The disc mode of manufacture allows better alignment between sites, wiring, border ridges around sites, and electrode areas if any of these are produced at different times from any of the others during manufacture. It also allows more surface space for wiring, because surfaces between discs can be used.

BRIEF DESCRIPTION OF THE DRAWINGS

Other features, objects, and advantages of the present invention will become apparent upon examination of the following detailed description, appended claims, and the accompanying drawings in which:

DETAILED DESCRIPTION OF THE PREFERRED EMBODIMENTS

Figure 1:
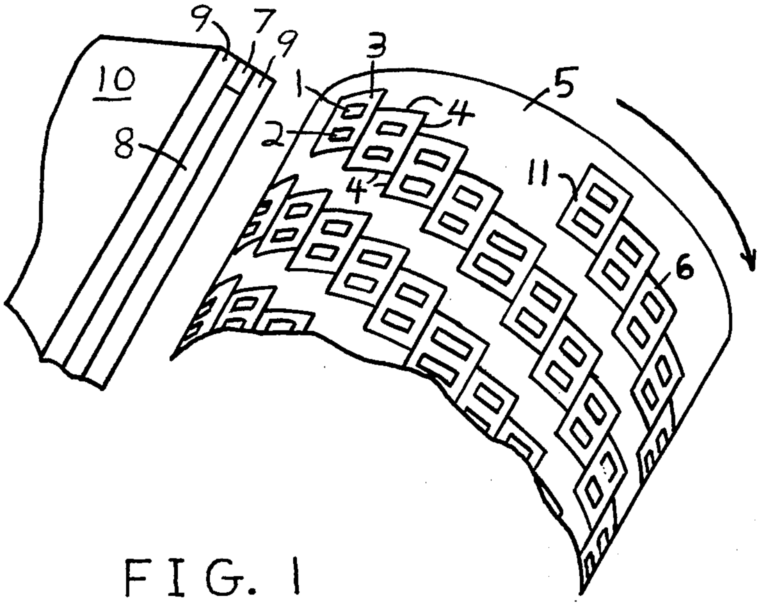
FIG. 1 shows a slit from which a stream of ink can issue and a rotating drum upon which are electrical sites to control the paths of segments of the liquid ribbon issuing from the slit.

FIG. 1 shows elements of a preferred embodiment of an electrostatically-controlled ink drop printer and image former with a rotating drum control surface and a new flowing ribbon of liquid ink input. On drum 5, which rotates in the direction of the arrow, are shown in a number of control sites, one of which is labelled 3. Each site is composed of areas, such as areas 1 and 2 of site 3, between which voltage can be applied. The voltages may actually be applied on associated geometrical surfaces immediately below the areas. Each site is substantially surrounded by a number of ridge lines, such as those labelled 4. The centers of the sites are located in groups in this embodiment on helical paths; although, since the sites can be made very small, a rectangular array of sites would suffice for printing. One group of five visible consecutively contiguous sites is labeled 6. Also shown in FIG. 1 is a slit 8, formed between flat plates 9. The plates are spaced apart by spacers, one of which is labeled 7.

Figure 2:
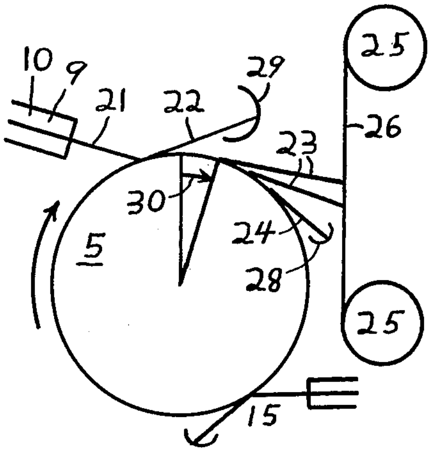
FIG. 2 shows a liquid ribbon issuing from a slit, a rotating drum, paths of segments of liquid from the drum, gutters for some segments, an output means, in this case on rollers, and a cleaning ribbon of liquid with its gutter.

The relation between the slit, the drum, ink paths, gutters, and an output means is shown in FIG. 2. During operation of the printer a ribbon of ink, which may be approximately 0.0005 inches thick, issues from slit 8 at a speed which may approximate 700 inches per second. The numbers quoted herein may vary by a factor of two or more, depending on which of various versions of the drum and ink are used. The ink then travels to the drum along a path labelled 21 in FIG. 2. After contacting the drum surface, the ink breaks up into segments of ink. The breakup can be due, at least in part to the cutting action of the protruding ridge lines 4 of FIG. 1. The ink preferably does not wet the surfaces of the protruding ridges. The breakup of the ink can also be due, at least in part to the sudden application of electrostatic forces producing adhesion between the ink and areas 1 and 2 on each site. The sites are called control sites, because the adhesion can be electrostatically controlled. The edges of the ink ribbon must not be used, because they will collapse inward toward the center of the ribbon about one quarter centimeter during the first inch of travel, assuming that the ink travels at 700 inches per second and that surface tension is about 50 dynes per centimeter and that the ribbon is roughly 0.0005 inches thick. Net surface forces acting on an element of area (segment of ink ribbon) are zero excpet near the edges of the ribbon. The edges of the ribbon may be broken into throw away segments, to allow air to pass through the ribbon edges, while the edges travel on their way to a gutter.

The areas 1 and 2 on each control site may be long and slender in the direction of motion of the sites, and they may be slanted to partially face each other so as to craddle an elongated segment of ink between them. Assuming that the site are roughly 0.003 inches square, the ink of a segment formed at a site will collapse due to surface tension to a more stable configuration in about 0.00002 seconds, which translates to about 0.014 inches or about five site lengths if the drum moves at roughly the speed of the ribbon.

The areas may be composed of a metal covered with metal oxide, such as tantalum covered with a dielectric coating of tantalum oxide. They should be sufficiently rounded to avoid dielectric breakdown between the two areas or between the ink drop and either area. The art of making thin film capacitors will provide many suitable combinations of metal and dielectric coating, which can support reasonable voltages capable of producing strong surface adhesion to an ink segment of different voltage from that of the area contacted. The ink segment if uncharged and unconnected to a voltage source may have a voltage between the voltages applied to the two areas on a site. To alter liquid adhesion the outer surface of the oxide may be silvered.

Portion of the ink ribbon not adhering to the drum surface due to electrostatic forces will begin to bound off the drum or leave due to centrifugal forces. Those portions not adhering initially will leave along path 22 of FIG. 2 and be captured in trough or gutter 29, eventually returning to the ink supply.

To aid the cutting action of the protruding ridges 4 on the drum surface, which ridges may be similar to knife edges, the difference between the ink velocity and the drum surface velocity at the time and points of first contact between the ink ribbon and the drum could be substantially radial toward the drum axis, with very little tangential component. From the point of view of an observer on the ink stream, the drum surface appears to be rolling along and cutting into the ink ribbon, while also somewhat altering the ribbon direction at the points of contact. The relative velocity of the ink relative to the drum surface at the time and points of contact should be large enough radially to cause, with the aid of other conditions, ink severing at the ridges, but small enough to allow capture of those portions of the ink ribbon intended to be held on the electrostatic drum sites.

The drum surface, including especially any ridges, and site areas, and other parts contacted by ink, should preferably be made of one or more materials to which the ink does not strongly adhere in the absence of applied electrostatic forces, so that the ink may be easily released from the surface. Because the ribbon of ink lays down locally like a blanket on the drum surface, air might become trapped between the ridges surrounding the control sites. Thus it would be useful to allow air to pass through the drum surface at each site and possible elsewhere. It might be advisable to apply a slightly negative pressure, while passing through the region in which the ink first contacts the drum. A foraminous material or a hole could be located between the areas 1 and 2. The drum surface may have gaps of considerable size between sites if desired. In fact the gaps may extend to the drum axis, if desired. On the other hand, there may be no gaps in the surface between sites. The ridges around sites may be broken at places to allow air to transfer away from a site.

The electrostatic forced applied at a site tend to elongate any ink segment held on the site, and prevent it from attaining a much rounder shape. During release of a segment, when the elctrostatic force is removed, the segment will pull into a more rounded shape, more suitable for traveling with a significant air speed. It is thus advantageous to partially shelter the segment from fast air currents until some rounding has taken place. If this objective is attained by blowing an air stream somewhat parallel to the ribbon and with somewhat the same speed, then it might also be advisable to cut all of the ribbon into segments at the drum surface, so that continuous ribbon portions leaving the drum will not cause an asymmetrical pattern of air currents around particular droplets. It is possible to attain the objective of partially sheltering the segment by having sufficiently high ridges around the sites, so that a sheltered valley is formed at the electrostatically active areas. The axially directed components of the ridges wil tend to drag air around the drum near its surface, and thus reduce segment air speed at and near the drum surface.

The ink segments held on electrostatic drum sites, equivalent to droplets, will be released after each droplet travels an individually chosen desired arc around the drum. The exact release position is a function of the control site, and may also be a function of the history of nearby droplets, if unequal drag is to be compensated for. The release position, together with other factors, determines where the ink segment, droplet, will impact on the output means. A secondary gutter 28 in FIG. 2 may be used for droplets initially held at electrostatic drum sites, but not desired on the output means. Paths to the secondary gutter may leave the surface before or after paths leading to the output means. If unwanted segments are released immediately from their sites, then they could proceed to gutter 29.

The electrostatic drum sites in the preferred embodiment are located on a number of helical paths, which wind around the axis of the drum. Site 3 and site 11 each begin one helical path. Also they each have the same axial coordinate, although it is not necessary that any two sites have the same exact axial coordinate. Successive sites on each helix are displaced substantially the same distance axially from the immediately previous site. This fixed distances is less than the minimum distance between helical paths, and the minimum center to center distance between nearest sites. Each different axial coordinate of a site in the preferred embodiment represents the axial coordinate of an origin for a separate stream of droplets, formed first as ink segments on the drum. Thus the spacing between nearest streams of droplets leaving the drum can be significantly less than the center to ceter distance between nearest sites. A plurality of sites on different helices, such as sites 3 and 11, can have the same axial coordinate. Thus droplets leaving from such a plurality of sites may be thought of as forming one droplet stream leaving the drum, even though the droplets may leave at slightly different angular coordinates around the drum. The droplets in nearest streams are not normally simultaneously located at equal distances along the stream direction, except in special cases.

The ink droplets impact an output means, which may be a roll of paper 26 on rollers 25 of FIG. 2. The output paper is moved at a rate which may be independent of the rotation rate of the drum. If the rate is independent of the drum, then to form a given character at a given target position located on the paper it will be necessary to vary the angle 30 of FIG. 2 at which the droplets to form the character are released. Angle 30 represents the angle around from some arbitrary direction at which droplets are released. Thus release times at particular sites will not only be a function of the character desired on the output, but will also be a function of the phase position of the output paper relative to the drum during the period necessary to form the character. It may be necessary to gutter droplets capable of producing one or more rows of characters before a succeeding row is produced, in order to give the output paper a chance to catch up to the drum, especially if the paper has been standing still awaiting further print instructions while the drum continues to rotate at a normal speed. In a preferred embodiment for printing, each row of characters will be represented by all sites located between two angular coordinates around the drum, these angular coordinates being fixed to and rotating with the drum. In other words the sites sufficient for printing exactly one row are located on a wedge of the drum.

Figure 3:
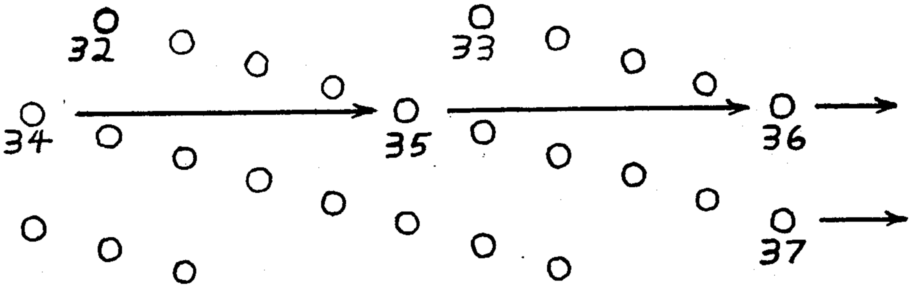
FIG. 3 is a top view of segments of ink in flight from the drum of FIG. 1.

FIG. 3 shows a top view of droplets in flight from the drum to the output. The droplets correspond to the sites visible on the drum of FIG. 1. Droplets 32 and 33 were at sites 3 and 11 respectively. With reference to FIG. 2, if desired, the droplets may be guided to impact the output paper on a rectangular array of the paper if appropriate departure angles 30 are chosen. The number of droplets between droplet 33 and 36 may be varied. Droplets extending from droplet 32 to droplet 35 or from droplet 32 to droplet 37 may be considered to be part of a single character defining the width of the character. Thus as a character is being scanned, a scan across the top of a character need not be completed before the scan across the next lower row of droplets forming the character is commenced. The description of the preferred embodiment is not meant to be restrictive to exclude obvious modifications, some of which have already been discussed, and some of which follow.

Alternative embodiments of the drum exist in which the sites are arranged or oriented differently. The sites may be diamond shaped so that the liquid ribbon first contacts a corner of a site rather than a side as shown in FIG. 1. Other site shapes are possible.

Since the site are so small (0.003 inches order of magnitude), and since for printing it is only necessary to space impact points within about 0.01 inches of each other to form a readable character using a 7 by 9 dot array, the sites for printing may be placed side by side on the drum. The axial center to center spacing between sites will be 0.01 inches in the direction parallel to the drum rotation axis. The spacing around the drum may also be variable depending on drum speed output speed and the desired degree of precision and shading in the output.

The voltage controlled areas on each site in the preferred version will face partly out from the drum and partly toward each other across a trough in between them. Beyond the drum surface undulation due to this, sites may also be raised or lowered significantly as a whole compared with the average drum surface, to induce the ink stream to tear more easily at the site borders. This is especially appropriate if the sites are each spaced apart from the others and thus share no common border, as may be the case in the immediately previous paragraph. However it may be easier to wire the sites electronically and later raise only that drum surface located at the ridges surrounding each site, by adding material at the ridges. A typical wiring diagram will be shown later in FIG. 4.

The sites may also be located on the teeth of a sawtooth shaped drum surface. The ink, which may have a velocity component not matching the drum's tangential velocity, may change direction significantly upon being contacted by a sawtooth protrusion from the drum. The claims will be stated generally enough to cover this and other possible variations.

Of course, the thickness of the ink ribbon, the size of the sites, the drum rotation rate, the extreme drum radius, the shape of sites, the amount of drum surface between sites, the spacing and arrangement of the sites, and the number of repetitions around the drum of groups of sites capable of forming a character, and the spacing, if any, between groups able to form characters can be varied. The choice of features will depend on design cost, precision, and speed of printing or image forming desired.

The voltage producing areas of a site may also take on various forms including a center spot for one area and a ring encircling the center spot for a second area. The spot might be replaced by a short rod, and the ring might look like a frustum of a cone.

The sites may be in a continuous array of contiguous sites sharing common borders. A rectangular array of rectangular sites is one possibility. A skewed (helically located centers) array of rectangular sites is another. An array of hexagonal sites is another possibility for a continuous contiguous array. Especially in these arrays which blanket a large portion of the drum surface continuously, it would be advisable to include one or more columns of transition sites at both ends of the drum. The segments produced at the transition sites will always be guttered but they will serve to produce a uniform environment for both producing and controlling segments on all sites interior from the ends of the drum and from the transition sites.

If the sites are contiguous or almost so, and if also a spiral pattern of site locations is used, then an extremely dense set of impact points can be obtained on the output means. Images approaching the quality of Xerox copies could be produced. Images with shading may be produced in obvious ways either by overlapping or repeating impact points, or by omiting points in an array whether overlapped or not.

There are many methods of carrying the logical control voltages to the sites from a central logical system. The logical system may be located on the drum, stationary on some other part of the printer, or partly on the drum and partly off. If the logical system, which decides what voltages are appropriate at each site, is located in part or in whole on the drum, then power to run the logic must be transfered as must the image commands from the printer base to the drum. The transfer can be effected via one or more commutators. Alternately, a transformer having one coil fixed on the drum and the other fixed on the printer base can be used to transfer image commands and or power. The magnetic axis of the coil on the drum should correspond substantially to the rotation axis of the drum, so that the magnetic axis remains stationary during drum rotation.

If the logical system, which transforms image commands to appropriate voltages for each site, is located on the printer base, then a series of commutators could be used to feed appropriate signals to lines leading to the sites. This would seem somewhat impractical if a large number of sites is involved although many of the sites would be repetitious, using the same signal.

Figure 4:
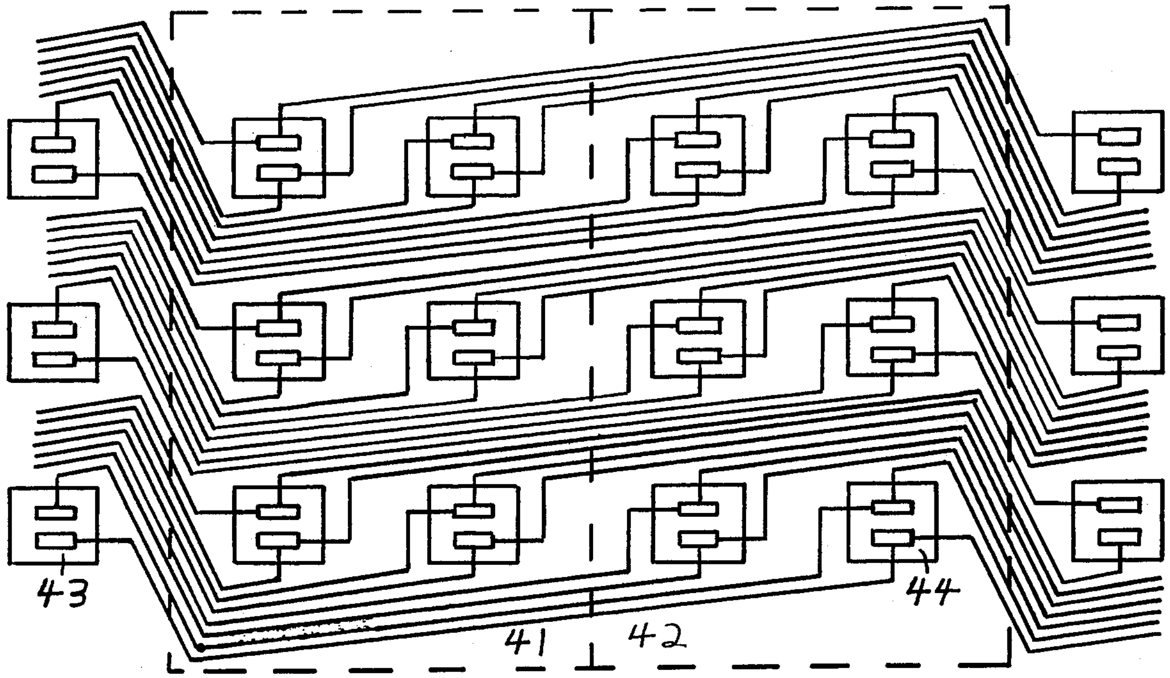
FIG. 4 shows a wiring diagram for sites on a drum similar to that of FIG. 1. Similar groupings of sites are wired in parallel.

FIG. 4 shows a wiring diagram for a simplified version of the drum sites assuming, for the sake of clarity in the drawing, that the array of sites necessary to form each character of a line of print is a three by two array per character. Array 41 and array 42 each enclosed in dotted lines are each capable of producing one character per revolution of the drum. In actuality each array should be roughly 7 by 9 instead of 3 by 2. Of course in the figure the curved drum surface (actually a small portion thereof) has been drawn as if flat. One of the two lines entering each site may be replaced by a common ground line. Notice that the corresponding areas on sites 43 and 44 are wired in parallel as are all sites spaced four apart in the drum rotation direction in FIG. 4. All sites wired in parallel will have the same voltage applied simultaneously. However, only one such site of a group wired in parallel will actually be controlling an ink segment at any particular time. The parallel wiring allows the physically same control logic to be used on several wedges of the drum, thus cutting the number of logic circuits necessary for the drum. The surface between wedges is not physically necessary to the operation of the drum, but there is no compelling reason to remove it by cutting grooves into the surface of the drum or leaving out grooves during manufacture if the wedges are made separately. When the word drum is used in the claims it should be understood that it really means a somewhat drum-like structure having many portions of surface substantially located on a cylindrical surface. The portions of surface will actually vary somewhat from being located on any one geometrical cylindrical surface, and combined they may not cover a continuous almost cylindrical surface the size of the drum, if grooves holes or wedges are missing from the drum.

The repetition distance of parallel wired sites around the drum is chosen so that it is greater than the distance around the drum between the point at which the ink of the ribbon contacts the drum and the last point at which ink segments leave the drum. For example, in FIG. 2 the arc around the drum surface between contacting ribbon 21 and departing segments 24, must be shorter than the arc around the drum surface between parallel wired sites.

The distance between array 41 and array 42 and each distance between succeeding arrays may be chosen somewhat arbitrarily, and may even vary from one pair of successive arrays to another, provided that the main logic is aware of the spacing. Spaces may be left for wiring. Considerable space may be left between the arrays, especially in printing applications, since the drum will probably move much faster than the output paper. Thus the cost of drums for slower applications can be reduced. In fact a drum might look more like a series of equal length paddles of a paddle wheel, if it is desired to remove the parts of the drum between arrays and if the arrays are widely spaced from one another. However, for aerodynamic reasons it is best to fill in most of the substantially cylindrical surface of the drum.

Arrays of sites corresponding to a single column of characters or to a few contiguous columns of characters may be manufactured on separate discs, which may later be joined side by side to form a drum, with the axis of rotation of each disc located and oriented along the drum axis of rotation. The parallel wiring may be located in part on the large flat surfaces of the disc. An orientation hole should run through each disc in at least two places, one of which may be the center of the disc. The orientation holes serve not only in putting the drum together properly, but also in orienting wiring, site areas, and site knife edge boundary ridges relative to each other during various steps in manufacture. The steps in manufacture may be taken in various orders depending on the process used. Of course, orienting techniques other than holes, such as magnetic or reflective spots combined with servomechanism feedback, may be used.

If a paddle wheel type drum is used then sites, circuits, and ridges can be produced on each paddle. The paddles can then be inserted into circular end wheels. The spaces between paddles at least at the radially extreme edges can be filled in, to form a roughly cylindrical drum and smooth air flow between one paddle and the next. The wiring can connect with logic residing on the wheels through connections at the ends of the paddles. The paddle wheel description is meant only to be suggestive of the scope of the claims. It is not the most preferred embodiment of the invention.

The art of producing finely detailed circuits and electrode plates in thin films on a surface is well advanced, because of its application to electronics. Although normally applied on a flat surface, many of the techniques can easily be generalized to apply on a curved surface such as the cylindrical part of a disc, especially if the disc can be precisely held and rotated. Assuming the following order of manufacturing steps, the forming of ridges around sites after the electrical circuits and plates have been formed on a surface and coated with proper dielectric seems less obvious, so the forming of ridges after the other steps will now be discussed.

One method of applying ridges to a precisely held cylindrical surface would be to print a conducting grid at the desired ridge locations. A voltage on the grid could then be used to attract and build up material at the grid location, by electroplating or some other method using electrostatic field sensitive materials. A similar method would be to lay down a grid of seed material and then surround the cylinder with a crystal growing medium.

A second method would be to make a grooved surface, which is the inverse of the desired ridged surface, each groove in the inverse corresponding to a desired ridge. The grooves of the grooved surface could then be filled with a cement which will not adhere to the grooved surface but which will cement to the cylindrical surface to which the ridges are to be affixed. The rest of the grooved surface should then be cleaned. If the one surface is then rolled in a precisely positioned way over the other, the cement will transfer to the surface containing the electrical circuits. Parts of the surface containing the electrical circuits could be temporarily coated to keep the cement from touching portions of the surface where ridges are not desired. The cement can be made like clay by adding tiny particles, so that it will retain its shape and not run along the surface to which it adheres. Other methods, some from the fields of printing or duplicating, may be adapted to apply the ridges to the cylindrical surface in a precise way.

Alternately, the circuits and or the ridges may be placed on a thin flexible surface while it is flat. The surface may then be wrapped around a drum.

Separate image signal decoding logic may be on each disc or the discs may each be fed a partially decoded or fully decoded signal determining site voltages necessary over a period of time to form a desired image. In any case, if logic is to be located on the drum, a set of signal lines must run from disc to disc and appropriate connections must be supplied in obvious ways.

Turning now to aspects of the ink ribbon, the ink ribbon may be produced by forcing liquid to exit under high pressure from a slit, such as slit 8 shown in FIG. 1. The cross-section of the ink ribbon will be approximately the same as the cross-section of the slit opening. The slit may be formed by placing spacers between two optically flat surfaces. The spacers need not be parallel and the ribbon may diverge slightly upon exiting.

The spacers may be produced by many methods one of which will be described. Scientists in the field of optics have been using optical benches to hold mirrors and the like in precise positions. On these benches two flat surfaces may be held and adjusted to be parallel within a fraction of a wavelength of sodium light. Changes of distance between the surfaces can be measured in wavelengths. Spacers of 0.0005 inches or less may be formed by hardening epoxy cement between the optical flats held at the proper distance. If the epoxy is chosen not to adhere to the flats, then it can be removed after hardening and and used as one or more spacers. Materials other than epoxy, such as plastic or low melting point glass may be similarly molded to produce spacers. These spacers, which can be mass produced may be placed between other flat surfaces. The surfaces can then be clamped or cemented together to the spacers to form a slit of appropriate width and depth and uniformity. Of course, other methods of producing spacers may be employed, and spacers may even be hardened and cemented to the optical flats. The edges of the spacers touching the ink should be smoothed and oriented to produce a smoothly exiting ribbon of ink.

If a slit is to be only as long as the length of a few print characters, then it is only necessary to have spacers at either end of the slit. However, if the slit is to extend across a whole page, then multiple spacers may be required between the end spacers. Those spacers not forming the end of a slit must be shaped to allow streamline flow around the spacers and through the slit. Preferably they should be placed away from the opening of the slit. If desired the ends of the slit need not be spacers but can be specially fitted before or after the extreme spacers.

The slit can be cleaned during use or after use in various ways including unclamping and opening the slit. The spacers in this case may be attached to either of both major slit surfaces. If the slit is to be opened, then guide pins should be provided, so that one flat surface may be replaced in correct relation to the other. If it is desired never to open the slit once formed, then it would be possible to run a pin or knife edge, composed of softer material than that of the slit, from one end of the slit to the other on the ink entrance side of the slit. This motion will dislodge all ink impurities and deposits, which may have lodged across the slit. A flow of cleaning fluid through the slit in the reverse direction from the ink flow direction could also be used to dislodge impurities and remove deposits. Thus it might be convenient to make the slit assembly, including upper and lower flat plates and spacers, removable from the printer for cleaning purposes, and to provide interchangable replacement slits. The operation of the printer is not very sensitive to the exact dimensions and speed of the ink ribbon within a few percent. Thus slightly different slits may not affect performance significantly. Positioning of the ribbon may also vary slightly without affecting printer performance adversely, but available precise positioning techniques should be used in placing and replacing the slit assembly. Acutally different inks, and different desired darkness of print may affect the selection of a slit, the same printer being used with different slits for different inks and print darknesses.

Another method of producing a ribbon of ink is to impact a solid surface with a stream of non-adhering ink and to allow the stream to diverge from the center of impact. The thickness of the stream, assuming a small slowdown in speed, will be almost inversely proportional to the distance from the center of impact. A small wedge of ink representing the ribon should be allowed to leave the surface at an appropriate boundary, and the rest of the ink should be guttered. The solid surface may be chosen flat, or may be chosen to provide equal path length to all points on a straight line, or some compromise surface may be chosen to produce nearly uniform thickness along a straight line exit border from the surface. An elliptical or parabolic surface can lead in part through a transition region onto a planar border surface to give enhanced uniformity of thickness. However, non-uniformity of thickness in the ink ribbon stream after leaving the surface can be compensated for by using non-uniformly sized site areas on the drum.

The drum may be long axially, stretching across a page and capable of producing a whole line of characters simultaneously. Alternately, the drum may be not much longer than a character and mounted on a device similar to a typewriter to produce one line of print at a time, while traveling in either direction. If the output means stands still during production of each line of characters, then the rotation axis may be chosen perpendicular to the line of print. Otherwise the axis should be turned to provide a component of control in the direction of motion of the output medium.

The drum may be cleaned either continuously or periodically by spraying another liquid ribbon at the drum. The cleaning ribbon may be aimed at a position around the drum not associated with image formation. Point 15 in FIG. 2 represents such a position. The cleaning liquid may travel at a velocity greater than that of the drum surface. It will eventually be trapped in a gutter and returned for reuse, unless a throw away liquid such as water is used in small quantities.

Assuming that closely spaced side by side ink streams are impinging on the surface of a rotating drum, then an array of sites located on rings, which rings are defined by the impact points of the streams as the drum rotates, can be employed. The sites need no longer be surrounded by a set of ridge lines to cut a ribbon of ink into segments. Only ridge lines roughly perpendicular to the ink streams are necessary to break the streams into droplets. The ridges may be continuous across the drum, parallel to the drum axis, or the ridges may exist only at the stream contact locations. Of course, the streams may issue from orifices, or be produced by some other method.

It is not necessary that the structures and combined effects used in this invention be applied only to printing and image forming. The same methods which determine whether a segment of ink reaches an output means or a gutter can be used to switch droplets or streams to one path or another. If a stream is to be switched the stream need only be broken at points between segments of the stream destined to take different paths. Any of the effects used to break a stream into droplets can also break a stream at any one particular point. Once a stream attaches itself to a surface it must be broken before it can be switched to a path not touching that surface, but once the break is induced the stream may be switched at that point. Fast switching of droplet streams or of semicontinuous streams can be applied in fluidics or in the chemical industry, to control chemical processes or to experiment with many mixtures simultaneously.

While the present invention has been disclosed in connection with the preferred embodiments thereof, there are other obvious variances of the present invention which fall within the spirit and scope thereof as defined by the appended claims.

What is claimed is:

1. A process for switching a fluid jet comprisng the steps of producing a stream of liquid in the form of a liquid ribbon, forming at least some of said ribbon of liquid into segments, which are each separate at some respective time on a surface while the said surface rotates around a given axis, one possible example of said surface being the outer surface of a drum, holding at least some said segments to remain temporarily in contact with areas of the said surface during its rotation around said axis longer than the segments would otherwise have remained in contact with said surface, by the application of controllable, sufficiently large electrostatic forces, applied predominantly during contact between said some said segments and said areas, the said areas being called control sites, said segments each occupying during contact with a site various respective ranges of position components parallel to said given axis, at least some of which respective ranges do not overlap each other, releasing said at least some said segments as droplets at desired rotation angles around said given axis by removing said sufficiently large electrostatic forces at appropriate times, allowing segments released within a given respective range of rotation angles around the said given axis, said range possibly depending on the site, to impact at least one output means, and collecting all the other said liquid in at least one gutter.

2. A fluid switching device comprising a means to produce a stream of ink in the form of a liquid ribbon, a rotating surface, for instance the outer surface of a drum, contacted by said stream of ink, sites located on said surface, each said site following a closed path in one direction and contacting said stream of ink once per journey around the path, each particular one of said sites breaking off a segment of said stream and holding said segment in contact with said site during a part of the said journey in which said segment would otherwise fly off said site, said segment being held by applying sufficiently large electrically controlled electrostatic forces to said segment predominantly during contact between said segment and said site, and releasing said segment by reducing said eletrostatic forces at a time at which said segment has a velocity direction falling within a given range of directions whenever and only whenever said particular one of said sites is selected to do all the above actions ascribed to sites during a given contact with the ink of said stream of ink, no segment, on the other hand, being released from said particular one of said sites at a time at which it has a velocity direction falling within said given range whenever said particular one of said sites is not selected to release a segment in said range of directions by actions during a given contact, said given range of velocity directions being chosen appropriately for each site and switching device orientation, each said closed path lying substantially in a respective plane parallel to the respective planes substantially containing the other said closed paths, said sites each occupying various respective ranges of position in a direction perpendicular to said planes, at least some of which said respective ranges do not overlap each other.

3. An ink drop printer and image former comprising a means to produce a liquid ribbon of ink, a surface rotating around an axis at least during the period when it is contacted by the ink of said ribbon of ink, said surface being contacted at times by the ink of said ribbon of ink, means to cause said ribbon of ink to separate, at least in part, into segments, at least some of said segments occupying respective ranges of position coordinate in the direction of said axis, which respective ranges do not overlap, an output means to which at least some of said segments travel and on which these segments form an image, at least one gutter, the gutters being positioned so as to catch those parts of said ribbon of ink not traveling to said output means from said surface, sites located on the said surface, said sites each contacting portions of the ink of said ribbon of ink, said sites being used to apply electrically controlled electrostatic forces to at least some of said segments, said forces being applied during controlled intervals, which in part determine a segment's release time and travel path from the surface, each said electrostatic force being applied predominantly during contact between a said segment and a said site, the direction of travel of each separate portion of ink upon leaving said surface determining in part whether each said separate portion of ink reaches said output means, the rest of the ink traveling to said at least one gutter, each said site having its own individual range of coordinates in the direction of said axis, at least some of which said individual ranges do not overlap.

4. The printer and image former of claim 3 in which the edges of said liquid ribbon of ink proceed to said at least one gutter without contacting any said site.

5. The printer and image former of claim 3 wherein each said site is substantially surrounded by at least one ridge line protruding from the said surface like a knife edged ridge.

6. The printer and image former of claim 3 wherein for each said site a different respective voltage is applied slightly beneath the surface of at least two respective areas of said site whenever said site is used to apply said electrostatic forces to a segment.

7. The printer and image former of claim 3 wherein the centers of said sites are located in groups, each group being substantially along a helical path.

8. The printer and image former of claim 3 wherein said liquid ribbon of ink issues from a slit.

9. The printer and image former of claim 3 wherein said surface on which said sites are located has gaps at least at some places between said sites.

10. The printer and image former of claim 3 wherein the said sites are on a drum and are not at the same radius from said axis, being the drum axis, as some average outer drum surface immediately surrounding said sites.

* * * * *